(12) United States Patent
Kennair, Jr.

(10) Patent No.: US 9,519,203 B1
(45) Date of Patent: Dec. 13, 2016

(54) QUICK-REPOSITION CAMERA SUPPORT

(71) Applicant: Donald Kennair, Jr., Belle Chasse, LA (US)

(72) Inventor: Donald Kennair, Jr., Belle Chasse, LA (US)

(*) Notice: Subject to any disclaimer, the term of this patent is extended or adjusted under 35 U.S.C. 154(b) by 0 days.

(21) Appl. No.: 14/812,708

(22) Filed: Jul. 29, 2015

(51) Int. Cl.
   *G03B 17/56* (2006.01)

(52) U.S. Cl.
   CPC .......... *G03B 17/561* (2013.01); *G03B 17/563* (2013.01); *G03B 17/566* (2013.01)

(58) Field of Classification Search
   CPC ..... G03B 17/56; G03B 17/561; G03B 17/566; G03B 17/02; A45F 5/00; A45F 3/14; A45F 2200/0533; A45F 2005/006; F16M 11/14
   USPC .................. 396/423, 419, 422, 424–426, 428
   See application file for complete search history.

(56) References Cited

U.S. PATENT DOCUMENTS

| | | | |
|---|---|---|---|
| 1,972,000 A | 8/1934 | Warner | |
| 2,140,050 A | 12/1938 | Hart | |
| 2,370,611 A | 2/1945 | Du Mais | |
| 2,427,593 A | 9/1947 | Etzel | |
| 2,466,713 A | 4/1949 | Kraus | |
| 2,617,142 A | 11/1952 | Cadwell | |
| 2,712,779 A | 7/1955 | Tolcher | |
| 2,746,369 A | 5/1956 | Beard | |
| 2,926,591 A | 3/1960 | Huffman | |
| 2,952,200 A | 9/1960 | Welch | |
| 3,002,663 A | 10/1961 | Fernelius | |
| 4,437,753 A | 3/1984 | Dunn | |
| 4,514,067 A | 4/1985 | Gallegos | |
| 4,687,309 A | 8/1987 | Breslau | |
| 4,963,904 A | 10/1990 | Lee | |
| 5,424,791 A | 6/1995 | Campbell | |
| 5,513,784 A | 5/1996 | Pretorius | |
| 6,517,133 B2 | 2/2003 | Seegmiller | |
| 2007/0147829 A1* | 6/2007 | Teratani | B60R 11/04 396/428 |
| 2007/0292125 A1 | 12/2007 | Saxton | |
| 2010/0104274 A1* | 4/2010 | Rowen | G03B 17/00 396/425 |
| 2011/0211164 A1 | 9/2011 | Monroe et al. | |
| 2014/0252051 A1 | 9/2014 | Esch | |
| 2014/0263489 A1 | 9/2014 | Hendrics | |

* cited by examiner

*Primary Examiner* — Rochelle-Ann J Blackman
(74) *Attorney, Agent, or Firm* — Keaty Law Firm LLC

(57) ABSTRACT

A quick-reposition camera support and method for photography of record in turbulent conditions, providing adjustable stability, controlled dropping, and quick recovery and repositioning after drops, allowing nearly continuous photography.

25 Claims, 4 Drawing Sheets

QUICK-REPOSITION CAMERA SUPPORT

BACKGROUND OF THE INVENTION

This invention provides a quick-reposition camera support and method for photography of record in turbulent conditions, providing adjustable stability, controlled dropping, and quick recovery and repositioning after drops, allowing nearly continuous photography.

This invention is my solution to a problem encountered in photographing ships, vessels, and activity in a busy port from a helicopter for the purpose of making a record of such ships, vessels, and activity. Differences in temperatures and conditions at the interface of water and land lead to a significant amount of sudden changes of altitude and bearing which will be called "turbulence" here. During such sudden turbulence, it is necessary to drop the camera, if it has not been already jarred loose, and to grab support straps or similar structures in the interest of personal safety. After such sudden turbulence, it is necessary to quickly reposition the camera and resume photography, because otherwise no photograph of record will have been taken of vessels and activity being flown over during the repositioning period. There are restrictions against flying into the airspace of most of the shore installations, so circling back to photograph anything missed is a complex and costly maneuver if it is possible at all. Because a camera will frequently be dropped or jarred loose in such conditions, it is desirable to control and limit the drop for the two purposes of 1) preventing damage to the camera, and 2) pre-positioning the dropped camera so that it can be quickly repositioned for resumption of photography.

This same underlying problem is present in many endeavors where photographs are taken from a moving air-, water-, or land-based vessel or vehicle, or where the photographer might be running or even standing still against turbulent weather.

None of the several existing systems or methods of stabilizing cameras addresses this specific need to be able to drop a camera for personal safety, or have it jarred out of the hands of the photographer, to have the dropping of the camera controlled so that the camera is not damaged, and to pre-position the dropped camera so that it can be quickly repositioned for resumption of photography.

Various patents teach the use of camera stabilizers that can be held like a rifle and can be mounted to a variety of devices. Some published patents and applications show devices that have a bipod mount aperture so that a bipod can be attached to steady the camera on irregular terrain. The documents also show devices that have a tripod/window mount aperture so that either a window mount or a tripod can be attached. Many publications show the use of flexible slings for supporting the device on the user's forearm. Many publications show adjustability feature of the camera support device.

U.S. Pat. No. 1,972,000 issued on Aug. 28, 1934 to Jack M. Warner for "Motion Picture Camera Support" discloses an invention relating to motion picture cameras, and more specifically to a support for such cameras. An object of the invention is to support a motion picture camera in such a manner that a rigid brace will be formed between the camera and the body of the cinematographer. Another object of the invention is to alternately support a plurality of motion picture cameras of different configuration from a single standard support. Still another object of the invention is to support a motion picture camera adjacent the body of a user so that a rapidly moving action shot, such as the flight of a kicked football, may be accurately followed.

U.S. Pat. No. 2,140,050 issued on Dec. 13, 1938 to Arthur E. Hart for "Photographing Apparatus" discloses an invention as an improvement in photographing apparatus, and relating more particularly to mounting a camera, preferably of the roll film type, upon a gun stock or similar support having means associated therewith for operating the camera shutter and for advancing the film across the field of exposure after each complete shutter operation.

U.S. Pat. No. 2,370,611 issued on Feb. 27, 1945 to Lee J. Du Mais for "Camera Support" discloses a camera support and is more particularly directed to a shoulder type of support on which the camera is secured and which support is bodily carried and maneuvered with the camera thereon. It is an object of the present invention to provide a camera support which is strong and durable, simple in construction and inexpensive to manufacture, and which support may be easily and readily handled for the instantaneous taking of pictures at any desired or required angle. A further object is the provision of a camera support having a shoulder rest at one end and a hand grip at its other end and between which rest and grip a camera retainable member is slideably positioned to selectively retain the camera at any desired angular position on the support. A further object is the provision of manually manipulative means slidably arranged on the support and rotatable for attachment to the camera; the attaching means being such as to effect a frictional gripping action for retaining said manipulative means in fixed adjusted positions on the support. Still a further object is the provision of adjustable strap means on the shoulder rest whereby the support and camera may be suspended from the shoulder of the wearer and may be instantly swing into picture taking position.

U.S. Pat. No. 2,427,593 issued on Sep. 16, 1947 to Francis E. Etzel Jr. for "Camera Support" discloses a camera support and more particularly to a support for cameras of the cine type. The primary object of the intention is to steady a camera during the exposure of film contained therein. Another object is to facilitate the rapid adjustment of the camera on the support in order to render the controls on the camera readily accessible to the user. These as well as other objectives may be attained by employing this invention, which embodies among its features a tubular body bent intermediate its ends to stimulate the general contour of a gunstock, a shoulder rest at the rear end of the body, a handle movable longitudinally of the body near its forward end and a threaded stud carried by the handle and adapted to enter the tripod socket of a camera to clamp the camera in place on the body.

U.S. Pat. No. 2,466,713 issued on Apr. 12, 1949 to Lazarus Kraus for "Hand Mount for Cameras" discloses an invention relating to a camera mount and particularly to a 1 portable hand-held type of camera mount for electrically driven motion picture cameras, or to spring powered cameras. The practice of mounting a motion picture camera on a tripod is cumbersome and motion is naturally limited to the swing of the tripod. The present mount permits filming of combat action or any other situation where there is need for following subjects in rapid and erratic motion and permits filming of sequences, which could not be obtained while limited to the swing of a tripod or to the unsteadiness of the usual hand-held arrangements. The object of this invention is to provide a camera mount, which offers a great degree of steadiness and maneuverability.

U.S. Pat. No. 2,617,142 issued on Nov. 11, 1952 to Clarence J. Cadwell for "Detachable Camera Handle" discloses an invention relating generally to the class of photography and being directed particularly to improvements in handles for cameras. The handle of the present invention is designed particularly for attachment to hand cameras in the threaded socket, which is customarily provided for mounting the camera upon a tripod.

U.S. Pat. No. 2,712,779 issued on Jul. 12, 1955 to John M. Tolcher for "Camera Support" discloses novel and useful improvements in camera attachments, and more particularly pertains to a support for cameras, whereby a camera may be adjustably supported on the body of the photographer.

U.S. Pat. No. 2,746,369 issued on May 22, 1956 to Donald M. Beard for "Shoulder Camera Mount" discloses an invention that may be manufactured and used by or for the Government of the United States of America for governmental purposes without the payment of any royalties thereon or therefor. The invention relates to a camera gun mount and more particularly to a shoulder supporting, hand held apparatus for use with cine type or other relatively heavy cameras when used with long focus or telephoto type lenses.

U.S. Pat. No. 2,926,591 issued on Mar. 1, 1960 to Levi D. Huffman for "Camera Support or Mount" discloses camera supports or mounts of the shoulder engaging, steady rest type. The main objects of this intention are as follows. First, to provide a camera mount or support which may be quickly and easily adjusted from collapsed to erected position and vice versa, and one which when in collapsed position is disposed at the side of the camera mounted thereon. Second, to provide a camera support or mount of the shoulder engaging, steady rest type, which is relatively light in weight and at the same time strong and rigid when erected. Third, to provide a collapsible camera support having these advantages which parts maybe very economically produced and assembled.

U.S. Pat. No. 2,952,200 issued on Sep. 13, 1960 to William F. Welch for "Camera Holding Means" discloses new and useful improvements in a camera holding means. It is an object of this invention to provide a means for holding a camera while taking pictures that will provide a steady anchor for ease in aiming while taking stills and panoramic pictures. It is another object of the invention to provide a camera accessory useful in steadying the camera and utilizing a tripod to relieve the user's arm from bearing the full weight of the camera. It is another object of this invention to provide a novel grip and chin rest for supporting the camera and for use of a tripod with the grip and chin rest. In taking moving pictures or still pictures where the camera is equipped with telescopic lens, the telescopic lens are usually heavy and extend from the front of the camera, making it difficult to keep the camera on the subject for extended periods of time and often there is neither time for setting up a tripod, nor a convenient place for use. It is an object of this invention to provide a ready means attached to the camera for providing adequate tripod support for such use. U.S. Pat. No. 3,002,663 issued on Oct. 3, 1961 to Arthur L. Fernelius for "Camera Support" discloses a support structure particularly designed for holding a movie camera, telescope or other similar sight instrument in any of several desired adjusted positions relative to the eye and body of the user, whereby to enable the user to conveniently and quickly move the instrument from an inoperative "carried" position to the most comfortable "use" position braced against the user's shoulder.

U.S. Pat. No. 3,105,430 issued on Oct. 1, 1963 to Arthur L. Fernelius for "Camera Mount" discloses a mount adapted to support such instruments as movie cameras, still cameras, telescopes, and other similar sight instruments. The portable hand-shoulder mount device has a central gunstock with front and rear ends and a telescoping tubular hand support arm pivotally connected at one end to the front end of the gunstock. The hand support arm includes a hand grip carried intermediate the ends thereof. The device has a means for positively locking the hand support arm in an adjusted position, a telescoping tubular shoulder support arm pivotally connected at one end to the rear end of the gunstock, and means for positively locking the shoulder support arm in an adjusted position. The shoulder support includes a shoulder rest adjustably pivotally secured. A camera platform is carried by the gunstock. A pistol grip carried by the gunstock has a trigger, and movement of the trigger causes actuation of the camera.

U.S. Pat. No. 4,437,753 issued on Mar. 20, 1984 to Robert E. Dunn for "Apparatus for Supporting a Camera Against the Sternum of the Photographer" discloses a camera support for use in stabilizing a handheld camera against movement, wherein the camera is fixed to a pedestal having two attached support arms which contact the photographer's body to stabilize the camera. Preferably, the two support arms contact the shoulder and sternal regions of the photographer's body for the best stabilization of the camera. Both support arms are adjustable, and the angular orientation and length of the second support arm may be adjusted independently of the angular orientation and length of the first support arm. Other aides to supporting the camera may be used in conjunction with the camera support. The camera support has two independently adjustable support arms for stabilizing the camera against the body of the photographer. One arm carries a shoulder support means that contacts and grips the shoulder, preferably having a concave shoulder-engaging surface similar to that of a rifle stock. The other arm carries a sternal support means, preferably a relatively flat pad adapted to rest against the sternum. The pad may be connected to the arm by a hinge to adapt to the contour of the photographer's body. Use of the sternal area as the main support surface is said to significantly reduce shaking of the camera due to heartbeat as compared with other bodily support surfaces. Both support arms can be independently adjustable, and the angular orientation and length of the second support arm may be adjusted independently of the angular orientation and length of the first support arm. The support arms may also be utilized to brace the camera against other available stable surfaces such as a wall or in conjunction with a support member extending to the ground. The camera support comprises a pedestal for mounting the camera and two adjustable support arms attached to the pedestal. The camera is fixed to the pedestal. In the preferred embodiment, the pedestal is composed of a base and a rotatable camera platform, with the camera fixed to the camera platform to allow rotation of the camera in the vertical plane. The two support arms are mounted to the pedestal by ball-and-socket joints, allowing adjustment of the angular orientation of each arm. Each support arm is extensible to enable adjustment of its length. A sternum support is fixed to the remote end of one arm and a shoulder support is fixed to the remote end of the other arm. In stabilizing a camera with the camera support of the invention, the support arm having the shoulder support is adjusted so that the shoulder support contacts the photographer's left or right shoulder, and so that the camera viewfinder is located to allow the photographer to utilize it to select the scene. Next, the support arm having the sternal support is adjusted to achieve contact with the photographer's sternum.

The photographer then grasps the camera in normal fashion and presses the sternal support and shoulder support against his body.

U.S. Pat. No. 4,514,067 issued on Apr. 30, 1985 to John C. Gallegos et al for "Twin Camera, Shoulder Carry, Rotary, Stabilization Pod" discloses a twin camera shoulder carry stabilizer device comprising a shoulder stock having mount means on opposed surfaces thereof for supporting opposed cameras. The forward part of the device can be rotated axially to bring either of the two cameras into immediate upright operative position respective to the photographer. Brackets are provided for holding the cameras and may be adjusted forward or backward according to the requirements of the photographer. Each camera is triggered by its own individual flexible release cable in the manner similar to a rifle trigger. The pod device is supported by two ends of a strap which enables the photographer to utilize two units, one on each side of the body, thereby doubling his capabilities. When not in use, the units swing under the arm with all camera lenses pointing down and staying close enough to the body to permit wearing an open jacket or overcoat to further protect the equipment and oneself. A variable resistance fastener allows the forward part of a stabilization pod to rotate axially and thereby bring either of two different cameras into immediate operative position. The device has a flexible cable release for each camera. Appropriate handles are provided for attaching the trigger release cables so that the cameras may be triggered in similar fashion to a rifle trigger. Means are provided for connecting a strap to the shoulder piece to facilitate carrying the entire apparatus. The shoulder carry pod has an adjustable "Y" bracket located immediately forward of each camera mounting bracket to further secure the camera, particularly in the case of telephoto lenses.

U.S. Pat. No. 4,963,904 issued on Oct. 16, 1990 to Chun Mao Lee for "Portable Camera Support Assembly" discloses a portable camera support assembly having an adjustment block, a support piece, a shoulder rest, a camera mount, a lengthwise-extendible hand grip, a body rest, a mount adjustment knob and a torsional spring assembly. The support assembly fixes to a lower end of a camera using the camera mount. The shoulder rest and body rest are used to support and balance the camera at the shoulder and upper body of the user respectively. The adjustment block, hand grip and mount adjustment knob allow the user to position the camera in a wide range of orientations during use and also allow the support assembly to be folded up when not in use. Additionally, the hand grip and body rest can be removed and a retractable monopole fixed to the adjustment block for support of the camera remote from the user. The support member is pivotally coupled to the adjustment block by a torsional spring assembly. The engagement block includes a circular wall from which extends an integrally formed cylindrical protrusion with a central threaded opening. The support member includes an annular support portion adapted to receive in a first direction the cylindrical protrusion, a rigid padded shoulder rest portion extending from the annular support portion in a second direction transverse the first direction, and a camera platform portion extending from the annular support portion in a direction opposite the second direction. The torsion spring assembly includes a torsional spring disposed within the annular support portion of the support member and having one end coupled to the cylindrical protrusion and an opposing end coupled to the annular support portion. The one is received within one of a plurality of slotted openings formed in the cylindrical protrusion. An adjustment knob is coupled to the cylindrical protrusion by a double ended bolt passing through a plate member for threaded coupling with the threaded opening of the cylindrical protrusion.

U.S. Pat. No. 5,424,791 issued on Jun. 13, 1995 to Robert D. Campbell for "Camera Stabilization Support" discloses a camera stabilizing support for steadying (either still or moving at a constant rate) a camera and/or camera and accessories by a photographer while taking pictures. The device includes a shoulder stock having an upper arm and lower arm, which together substantially encompass the photographer's shoulder, an extension member attached to the shoulder portion, and a rectangularly shaped enclosure frame attached to the extension member. The rectangularly shaped enclosure frame is so constructed as to provide a hand piece for the photographer to grip and hold the device during picture taking as well as carrying over long distances. In addition, as part of the enclosure frame, an upper camera and accessories plate and lower strobe light and tripod plate are provided. The upper plate is adapted to receive a release mechanism for securing the camera and lens, and the lower plate alternately or simultaneously secures a strobe light bracket and a tripod. The rectangularly-shaped enclosure frame also serves as a carrying handle for long distances, especially when the camera and accessories are mounted. By means of this device, the photographer is able to grip the camera stabilization support in a securely held position to stabilize the camera whether the photographer is standing still or in motion to track a moving target.

U.S. Pat. No. 6,517,133 issued on Feb. 11, 2003 to Steve Seegmiller et al for "Sighting Mount Device" discloses sight mounting devices that may be utilized in combination with sighting devices such as sighting scopes, camcorders and camera. The sight mount device has an elastomeric mounting plate adapted to receive a variety of sighting devices. The sight mounting device is compact as it has a retractable shoulder stock extension that can be retracted and extended as needed. The sight mounting device is highly versatile in that it can be held like a rifle and can be mounted to a variety of devices such as a bipod, a tripod and a window mount. The device has a stock body with a shallow recess on the top of the body that holds an elastomeric mounting plate of support platform adapted to receive a variety of sighting devices. The mounting plate and the recess are preferably sized such that the mounting plate extends slightly beyond the top of the stock body. Since the top of the stock body is flat, the mounting plate is the surface that is contacted by the sighting device as the sighting device is attached to the sight mounting device by a mount screw. The sight mounting device is compact as it has a retractable shoulder stock extension that can be retracted and extended as needed. More particularly, the retractable shoulder stock extension has a slide rod that slides within a slide bore in the stock body. The slide rod has a slot extending along a portion of its length. The mount screw extends through the slot and the slide rod slides on the mount screw in and out of the slide bore in the stock body. The sight mounting device is highly versatile in that it can be held like a rifle and can be mounted to a variety of devices. For example, it has a bipod mount aperture at its distal end so that a bipod can be attached to steady the sight mounting device on irregular terrain. It also has a tripod/window mount aperture so that either a window mount or a tripod can be attached.

U.S. application Publication Number 2007/0292125 published on Dec. 20, 2007 to Lawrence N. Saxton for "Portable Camera Support" discloses a portable camera support that includes a handle and a first support member attached to the handle. The first support member is attached to the handle such that the first support member rotates relative to the handle in a first plane. The portable camera support further includes a second support member that is attached to the first support member. The second support member is attached to the first support member such that the second support member rotates relative to the first support member in a second plane, which is orthogonal to the first plane. The portable camera support further includes a mounting member that is adapted to be mounted to a camera. The mounting member is attached to the second support member such that the mounting member rotates relative to the second support member in a third plane, which is orthogonal to the first plane and the second plane. The first support member may include a first planer section and a second planer section such that the first planer section is orthogonal to the second planer section. In addition, the second support member may include a first planer section and a second planer section with the first planer section being orthogonal to the second planer section. In some embodiments, the portable camera support includes a handle and a mounting member that is adapted to be mounted to a camera. The mounting member is attached to the handle such that the mounting member rotates relative to the handle. The handle includes finger-shaped indentations to facilitate gripping the handle. The handle may further include a concave support surface on one side of the handle while the finger-shaped indentations are on an opposing side of the handle. The concave support surface may extend into the flat support surface such that the flat support surface is on one side of the concave support surface and on an opposing side of the concave support surface. In some embodiments, the handle includes a first recess that extends into the flat support surface on one side of the concave support surface and a second recess that extends into the flat support surface on an opposing side of the concave support surface.

U.S. Publication Number 2011/0211164 published on Sep. 1, 2011 to Douglas J. Monroe et al. for "Camera Stabilizer" discloses a camera stabilizer including a grip for cameras that provides for stability of the camera without a shoulder mount or shoulder mount harness. The current camera stabilizer attaches around the arm of the user then extends through a member roughly parallel to the forearm to a grip that is held by the user. The grip is attached to the member by a ball joint that allows free positioning of the grip relative to the member but may then be locked in position for use. The camera is then attached to the grip. This allows the user to stabilize the camera by holding the elbow closer to the torso, by resting the elbow on a steady object, or by simply flexing the wrist which applies tension to the member thereby providing a more stable grip on the camera and a resulting more stable picture. A kit is also disclosed that includes the camera stabilizer and a harness for tethering the camera stabilizer to the torso of the camera operator. The camera stabilizer can include an arm piece connected with the joint, the ann piece extending substantially the length of the human forearm. The arm piece can include a distal end connected to the joint so as to be pivotally connected to the grip and a proximal end. The camera stabilizer can include a forearm brace located at the proximal end of the arm piece, the forearm brace configured to at least partially encircle a human forearm proximate to the human's elbow.

U.S. application Publication Number 2014/0252051 published on Sep. 11, 2014 to Brian Esch for "Bungee Sling and Method of Making" discloses a sling that includes a first strap having an elastic sidewall or tubular webbing enclosing a hollow interior and a pair of elastic cords attached at each end to the strap and located inside the hollow interior of the strap. The first strap also has a first connector member on a first end of the first strap; and a second strap has an elastic sidewall tubular webbing enclosing a hollow interior. A pair of elastic cords are attached at each end to the strap and located inside the hollow interior of the strap, the second strap also has a second connector member on a first end and releasably connectable to the first connector member of the first strap, the first and second straps each having second ends permanently coupled together. The bungee sling allows the sling to expand as well as contract in order to provide two completely separate functions: expand: the elastic bungee sling allows the user to evenly and accurately push his weapon away from the user's body (which could not be done with a traditional, fixed/non-bungee sling). Instances of this would be striking an opponent with the barrel or muzzle of the weapon, which helps subdue opponents and encourage compliance with verbal commands. The sling also allows striking an opponent with any other part of the weapon, i.e., magazine, grip, etc., which is useful when an opponent is trying to gain control over a user's weapon, and lengthening the reach of the weapon to push open a door without the user's body having to get physically closer to the door. When the sling is contracted, after being stretched or lengthened, the kinetic energy stored up in the lengthened elastic cords inside the sling urges the sling to shrink or contract back to its original length. This is useful to many users because it pulls the weapon back into the user's shoulder, providing a more solid shoulder mount and thus a more accurate shot. Again, this could not be done with a traditional, fixed/non-bungee sling.

U.S. application Publication Number 2014/0263489 published on Sep. 18, 2014 to Eric Hendrics "Modular Convertible Tactical Sling System" discloses a modular convertible tactical sling system for a firearm or other item. The sling system includes a primary strap, a hub mount attachment, and at least two secondary straps. The configuration of the primary strap, the hub mount attachment, and the at least two secondary straps can provide for either a single point attachment to a firearm or a two point attachment to a firearm. The primary strap includes a strap member extending from a first end to a second end wherein the first end includes a buckle portion having an insertion part and the second end includes a buckle portion having a receiving part. The hub mount attachment includes a central hub portion and a first and second insertion part extending therefrom. The central hub portion includes a flush cup mount and at least one ring. The hub mount attachment includes a central hub portion and at least two insertion parts extending therefrom, the central hub portion including a flush cup mount and a first and a second ring, and the insertion parts each including an insertion appendage having catches formed therewith. The secondary straps are interchangeable between flush cup compatible connectors and accessory clip compatible connectors, such that the sling system may be used with either type of connector. Additionally, the hub mount' allows a fast and easy conversion of the sling system between a single-point sling mode and a two-point sling mode. The two secondary straps can be in the form of clip-type secondary straps, swivel-type secondary straps, or a combination thereof. The clip-type secondary strap includes a strap member extending from a first end to a second end, the first end including a buckle portion having a receiving part that is configured for removable engagement with the insertion part, and the second end including a clip connector. The swivel-type secondary strap includes a strap member extending from a first end to a second end, the first end including a buckle portion having a receiving part that is configured for removable engagement with the insertion part, and the second end including a push button swivel mount.

There is a need for a system and method to stabilize a camera for photography of record in turbulent conditions.

SUMMARY OF THE INVENTION

The present invention provides a quick-reposition camera support and method for photography of record in turbulent conditions, providing adjustable stability, controlled dropping, and quick recovery and repositioning after drops, allowing nearly continuous photography.

The present invention solves existing problems of dropping a camera in turbulent conditions for personal safety, or having it jarred out of the photographer's hands, preventing damage to the camera, and providing for quick recovery and repositioning of the camera for resumption of photography.

BRIEF DESCRIPTION OF DRAWINGS

Reference will now be made to the drawings, wherein like parts are designated by like numerals, and wherein.

DETAILED DESCRIPTION OF THE INVENTION

Figure 1:
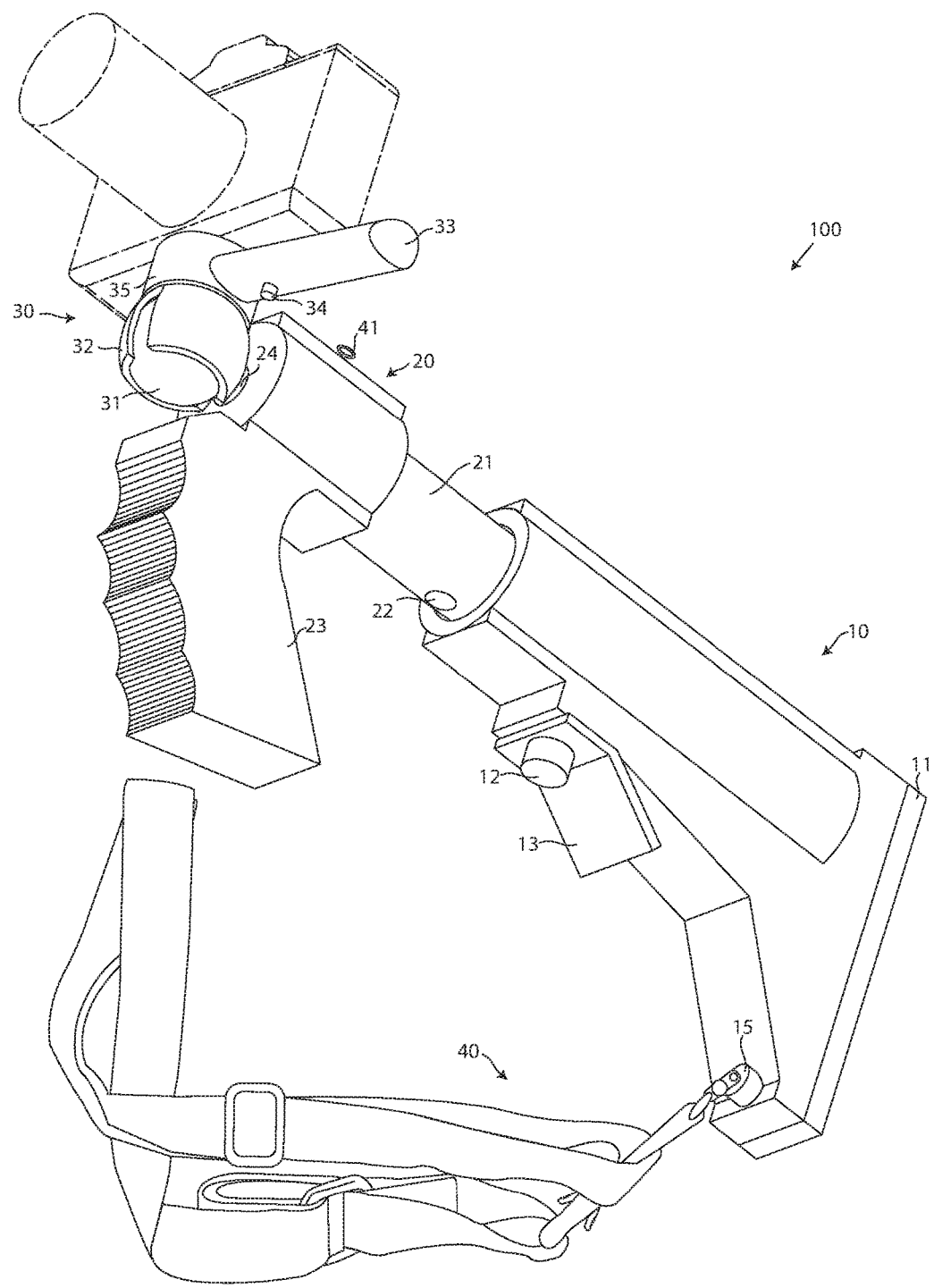
FIG. 1 is a perspective view of an embodiment of the invention in use.
Figure 2:
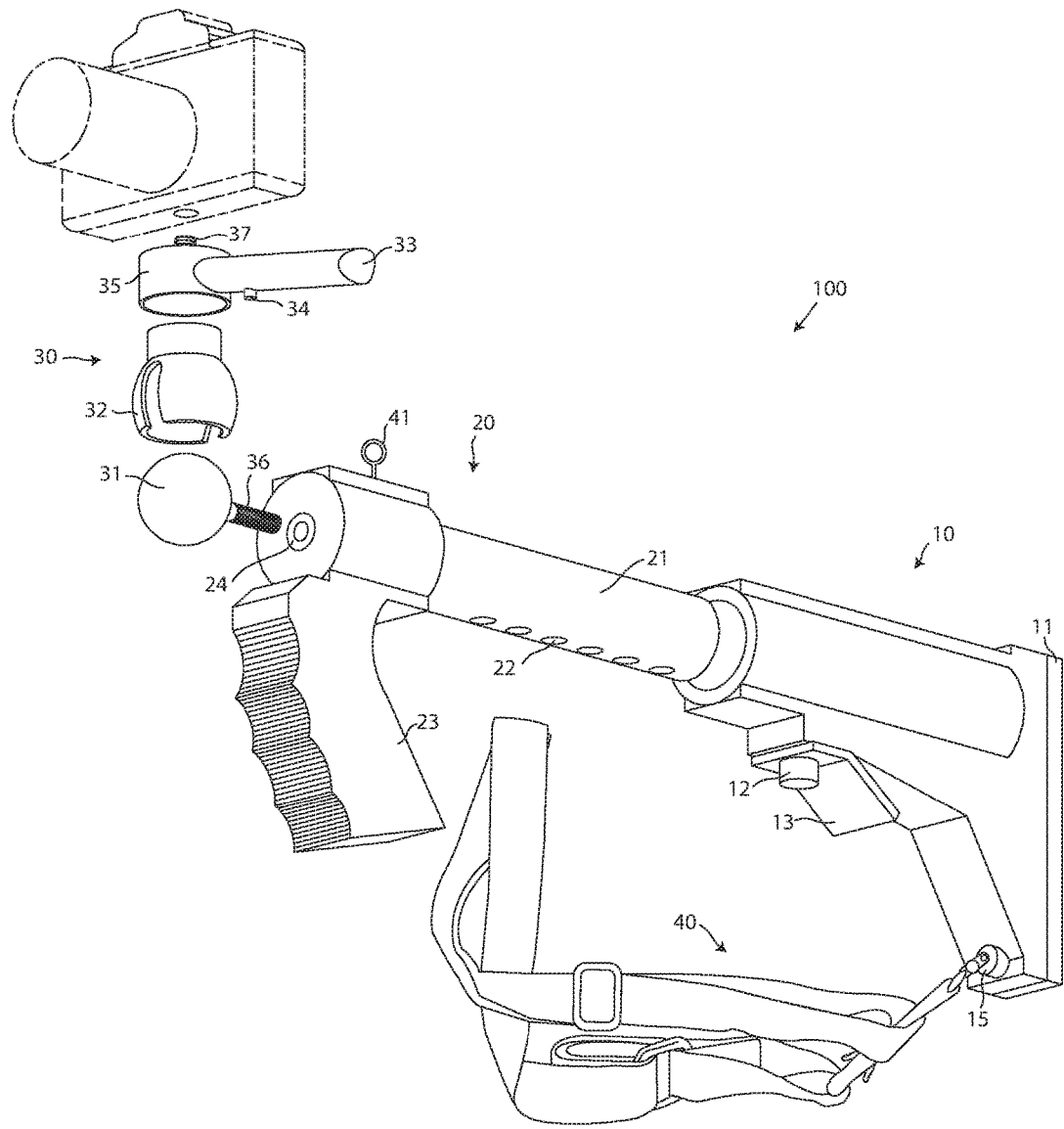
FIG. 2 is an exploded perspective view of an embodiment of the invention in use.

Referring to FIG. 1 & FIG. 2, an embodiment of the quick-reposition camera support 100 comprises a stock section 10, an inline section 20, a panning section 30, and an adjustable strap 40, which together provide for mounting of a camera, adjustment of the length and orientation of the support to the photographer's requirements, aiming of the camera and locking to a chosen position, bracing and steadying of the camera and support against the photographer's body or other structure during use in turbulent conditions, and the controlled dropping and quick repositioning of the camera and support after any loss of control of the camera during an incidence of turbulence.

The stock section 10 has cushioning 11 at the end proximal to the photographer's body or other supporting surface against which the stock section will be placed. Depending on specific conditions encountered, the cushioned proximal end of the stock section can be placed against a portion of the torso of the photographer, such as the sternum or chest, against a portion of an arm, such as the shoulder or bicep, against a portion of a leg, which might be advantageous in a seated position, or against some part of the vessel or vehicle.

An adjustable strap 40 is attached to a strap connector 15 or to a strap connector 41 provided on the stock section 10 for the purpose of securing the quick-reposition camera support and the attached camera either to the photographer's person or to another structure being used for stability. This adjustable strap 40 limits the distance that the camera can be dropped. Because of the positioning of the strap connector on the stock section, the dropped quick-reposition camera support and the attached camera will always be suspended in a known position and orientation which facilitate a quick recovery, repositioning, and resumption of photography.

Attached to the stock section 10 is an inline section 20 having an inner support 21 that is inserted into or over an inline receiver at the distal end of the stock section in such a way that the overall length of the combined stock section 10 and inline section 20 can be adjusted to suit a particular photographer, camera, and photography conditions. Adjustment stops 22, such as holes in an embodiment shown, are provided along the outer surface of the inner support. A chosen adjustment stop can be engaged by an adjustment pin 12 provided on the stock section, and the adjustment pin 12 can be made to engage or disengage by operation of an adjustment lever 13 operating on the pin, allowing an appropriate length of the quick-reposition camera support and attached camera to be set or re-set.

The inline section 20 has at its distal end an inline handle 23 attached to the inner support 21 in such a way that the inline handle is fixed in line with the main axis of the quick-reposition camera support, and therefore with the main vector of supporting and stabilizing force. The inline handle provides visual and tactile indications of the direction in which the quick-reposition camera support is pointed, and the inline handle is located essentially at the end of a lever formed by the camera support when the cushioning 11 or proximal end of the stock section 10 is braced against a supporting surface during use. In such a placement and orientation, the inline handle provides an efficient point to grasp a dropped camera support and to recover and reposition the support and camera and resume photography.

Also at the distal end of the inline section 20, a ball mount is provided for attachment of the panning section 30. In an embodiment, the ball mount is a threaded sleeve attached inside the inline section 20, along the main axis of the camera support.

The panning section 30 provides a high degree of controlled movement of a camera attached to the quick-reposition camera support, in essentially all useful forward-facing, side-facing, and downward-facing directions, and provides for releasable locking in place of any desired position. The panning section 30 is connected to the distal end of the inline section by the ball mount 36 which is in turn connected to the ball 31. In an embodiment, the ball mount 36 is a rod embedded in the ball 31 on one end and having a threaded portion at the other end adapted to fit the threaded ball mount 24 in the inline section 20.

The camera connector 37 provides a removable connection to a camera, and is the point where the complete quick-reposition camera support and the camera are securely attached. Many cameras have a standard threaded socket or "tripod" attachment. Cameras for professional use generally have the threaded socket located on the bottom surface of the camera in a location that is in line with the plane of the film or sensor and the vertical axis of the film or sensor. Large lenses sometimes have an additional threaded socket for the purpose of avoiding strain on the camera's lens mount. An intermediate adapter can be used to change the camera's effective axis, where needed. In an embodiment, the camera connector 37 is a threaded rod adapted to fit standard threaded sockets on most cameras.

In a preferred embodiment, the panning section comprises a ball 31 attached to the distal end of the inline section 20 through a ball mount 36 and ball mount receiver 24, a ball cover 32 fitting over the ball and allowing for movement wherever the ball cover and slots in the ball cover do not come in contact with the ball mount, a rotating mounting surface 35 rotatably connected to the ball cover 32 and having a transverse handle 33 and a lock-release 34. At least one slot cut into the ball cover allows for free movement along an axis defined by the slot, and the rotating mounting surface is placed so as to rotate around that axis, providing essentially complete freedom of movement in forward-facing, sideward-facing, or downward-facing directions. The transverse handle provides a way to move the panning section 30 as desired, and provides a visual and tactile indication of the orientation. The lock-release can be manipulated to lock the panning section 30 into position or to release it for adjustment. When the position of the panning section, and therefore the attached camera, is locked in relation to the inline section and stock sections, and therefore the inline handle 23, the entire quick-reposition camera support and attached camera are easily recovered and repositioned, and photography is quickly resumed, after the camera support is dropped or is jarred loose as a result of turbulence.

Figure 3:
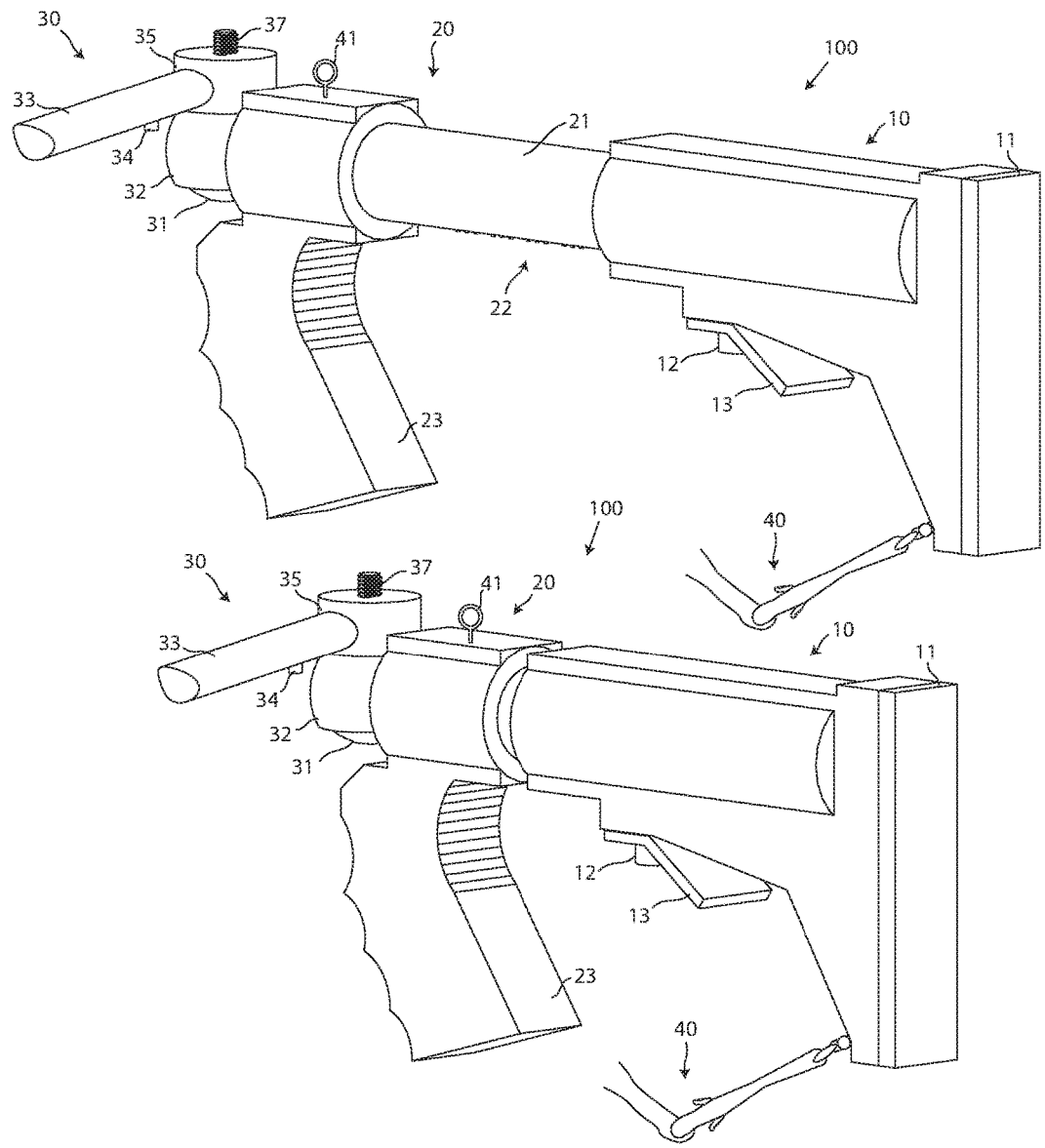
FIG. 3 is two perspective views of an embodiment of the invention extended and contracted.

Referring additionally to FIG. 3, the effective length of the quick-reposition camera support 100 can be adjusted by engaging the adjustment lever 13 which disengages the adjustment pin 12 from the adjustment stops 22 in the inner support 21, allowing the inline section 20 to be moved closer to or further from the stock section 10, and then fixed in place by release of the adjustment lever, allowing the adjustment pin to re-engage with the appropriate adjustment stop 22, locking the camera support at a desired length.

Figure 4:
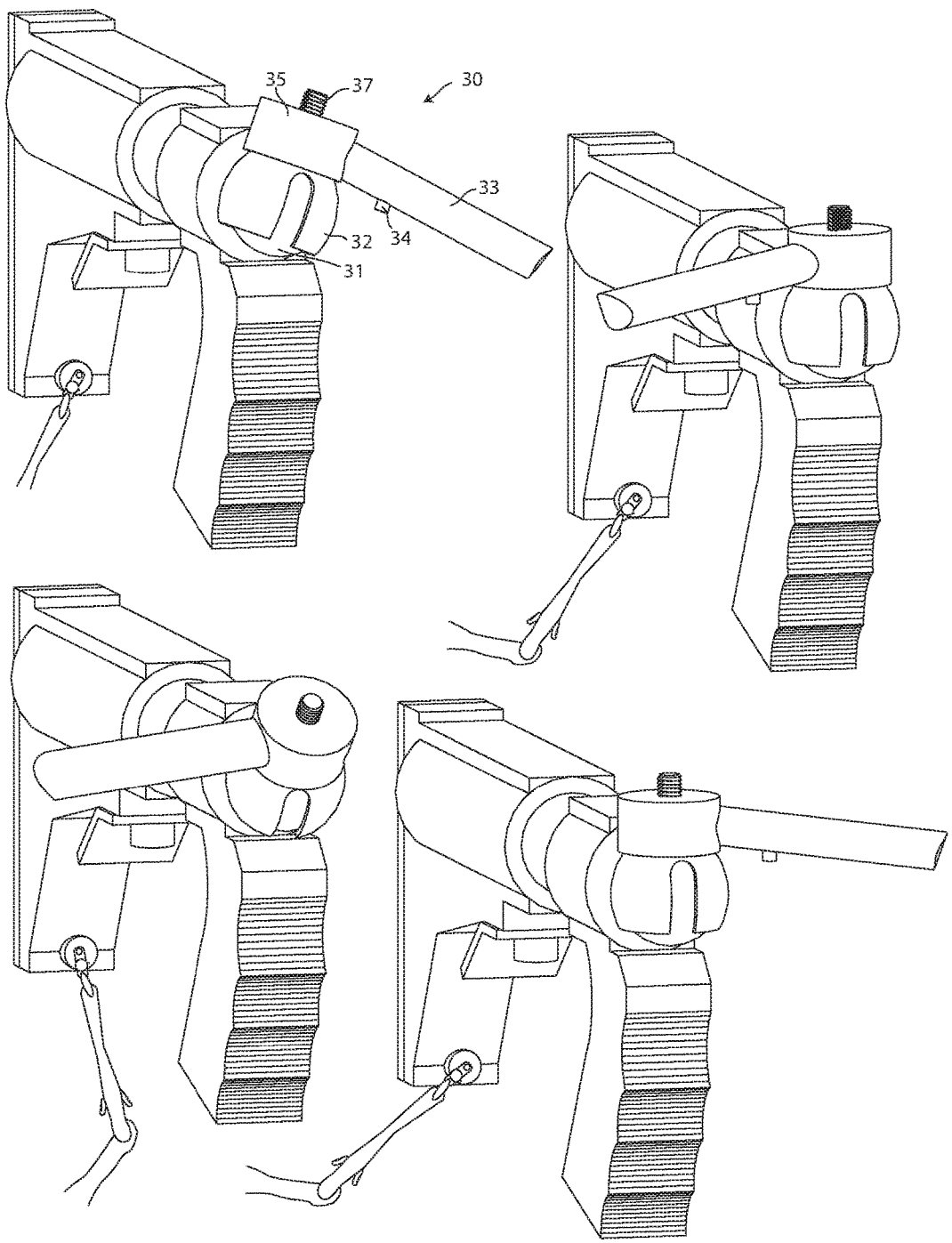
FIG. 4 is four perspective views of an embodiment of the invention illustrating the range of movement of the panning section.

Referring additionally to FIG. 4, the panning section 30 allows a high degree of controlled movement of a camera attached through the camera connector 37 about several axes, under the control of the transverse handle 33, where any desired position can be locked in place and later released and repositioned by manipulation of the lock-release 34. In an embodiment, the camera connector is attached to a rotating mounting surface 35 providing practically unlimited rotation about the axis of the camera, which would correspond to the vertical axis of the film or sensor of a camera having a standard threaded socket.

The quick-reposition camera support can be made of any material or combination of materials having the appropriate shape-retaining, strength, durability, and tooling properties, including metals, woods, plastics, and composite materials.

Many changes and modifications can be made in the present invention without departing from the spirit thereof. I therefore pray that my rights to the present invention be limited only by the scope of the appended claims.

I claim:

1. A quick-reposition camera support for turbulent conditions, comprising:
   a stock section adapted to placement against a photographer's body or other stable surface, having proximal and distal ends in relation to the photographer, and having cushioning at said proximal end, an inline receiver at said distal end, an adjustment pin operated by an adjustment lever, and a strap connector;
   an inline section having an inner support at a proximal end adapted to adjustably connect to said stock section at said inline receiver, a plurality of aligned openings formed on an underside of the inner support, the openings being adapted to engage said adjustment pin at one of a plurality of positions, and an inline handle having a sleeve secured in a surrounding relationship over a portion of and in co-axial alignment with the inner support at a distal end of the inner support, the sleeve having a ball-mount receiver;
   a panning section having a ball mount adapted to connect with said ball-mount receiver, connected to a ball inside a ball cover adapted to provide a range of movement, a rotating mounting surface rotatably connected to said ball cover, having a transverse handle, a lock-release adapted to locking and unlocking the positioning of said panning section, and a camera connector; and
   an adjustable strap connected to said strap connector;
   where said adjustment pin, adjustment lever, and adjustment stops provide for adjustment of overall proximal-to-distal total connected length of said stock section and said inline section, where said ball, ball cover, and rotating mounting surface provide for movement in a plurality of axes of a camera attached to said camera connector, where said lock-release provides for the fixing in position of a camera and said quick-reposition camera support, where said adjustable strap secures said quick-reposition camera support to the photographer's body or other stable surface; and
   where during extreme or sudden turbulence the photographer drops said quick-reposition camera support and an attached camera, the distance and force of the drop are limited, and the ability to quickly recover and reposition the camera and resume photographing are increased.

2. The quick-reposition camera support of claim 1, where said cushioning further comprises a closed-cell foam material.

3. The quick-reposition camera support of claim 1, where said adjustment pin further comprises a spring-loaded normally closed pin.

4. The quick-reposition camera support of claim 1, where said stock section is made of a hard plastic material.

5. The quick-reposition camera support of claim 1, where said inline handle further comprises a hard core surrounded by a softer grip material.

6. The quick-reposition camera support of claim 1, where said camera connector further comprises a threaded rod adapted to fit a standard threaded socket in a standard camera.

7. The quick-reposition camera support of claim 1, where said inner support further comprises an essentially cylindrical cross section.

8. The quick-reposition camera support of claim 1, where said ball mount receiver further comprises a threaded sleeve, and said ball mount further comprises a threaded rod.

9. The quick-reposition camera support of claim 1, where said strap connector is located near the proximal end of said stock section.

10. The quick-reposition camera support of claim 1, where said adjustable strap further comprises a flexible fabric material.

11. A method for reliable photography of record in turbulent conditions, comprising:
    providing a quick-reposition camera support, comprising:
    an L-shaped stock section having a first stock portion and a second stock portion extending transversely to the first stock portion, the second stock portion being adapted to placement against a photographer's body or other stable surface, the stock section having proximal and distal ends in relation to the photographer, and having cushioning at said proximal end, an inline receiver at said distal end, a strap connector secured to the second stock portion, and mounted between the first stock portion and the second stock portion an adjustment pin operated by an adjustment lever;

an inline section extending parallel to the first stock portion and having an inner support at a proximal end adapted to adjustably connect to said stock section at said inline receiver, a plurality of aligned openings formed on an underside of the inner support, the openings being adapted to engage said adjustment pin at one of a plurality of positions, and an inline handle having a sleeve secured in a co-axial surrounding relationship over a portion of the inner support at a distal end of the inner support, the sleeve having a ball-mount receiver;

a panning section having a ball mount adapted to connect with said ball-mount receiver, connected to a ball inside a ball cover adapted to provide a range of movement, a rotating mounting surface rotatably connected to said ball cover, having a transverse handle, a lock-release adapted to locking and unlocking the positioning of said panning section, and a camera connector; and an adjustable strap connected to said strap connector;

where said adjustment pin, adjustment lever, and adjustment stops provide for adjustment of overall proximal-to-distal total connected length of said stock section and said inline section, where said ball, ball cover, and rotating mounting surface provide for movement in a plurality of axes of a camera attached to said camera connector, where said lock-release provides for the fixing in position of a camera and said quick-reposition camera support, where said adjustable strap secures said quick-reposition camera support to the photographer's body or other stable surface; and where during extreme or sudden turbulence the photographer drops said quick-reposition camera support and an attached camera, the distance and force of the drop are limited, and the ability to quickly recover and reposition the camera and resume photographing are increased;

attaching a camera to said quick-reposition camera support through said camera connector;

adjusting position of the camera through manipulation of said inline handle and said transverse handle;

locking position of the camera through said adjustment lever and said lock-release;

securing said quick-reposition camera support and attached camera to the photographer's body or other support surface through said adjustable strap;

recovering and repositioning said quick-reposition camera support and attached camera after dropping for personal safety reasons or jarring loose by extreme or sudden turbulence; and quickly resuming photography of record.

12. The method for reliable photography of record in turbulent conditions of claim 11, where said cushioning further comprises a closed-cell foam material.

13. The method for reliable photography of record in turbulent conditions of claim 11, where said adjustment pin further comprises a spring-loaded normally closed pin.

14. The method for reliable photography of record in turbulent conditions of claim 11, where said stock section is made of a hard plastic material.

15. The method for reliable photography of record in turbulent conditions of claim 11, where said inline handle further comprises a hard core surrounded by a softer grip material.

16. The method for reliable photography of record in turbulent conditions of claim 11, where said camera connector further comprises a threaded rod adapted to fit a standard threaded socket in a standard camera.

17. The method for reliable photography of record in turbulent conditions of claim 11, where said inner support further comprises an essentially cylindrical cross section.

18. The method for reliable photography of record in turbulent conditions of claim 11, where said ball mount receiver further comprises a threaded sleeve, and said ball mount further comprises a threaded rod.

19. The method for reliable photography of record in turbulent conditions of claim 11, where said strap connector is located near the proximal end of said stock section.

20. The method for reliable photography of record in turbulent conditions of claim 11, where said adjustable strap further comprises a flexible fabric material.

21. A camera support for supporting a camera in turbulent conditions, comprising:

a stock section having a first stock portion and a second stock portion secured transversely to a proximal end of the first stock portion;

an adjustment lever mounted between the first stock portion and the second stock portion;

an adjustment pin operationally connected to the adjustment lever;

an inline section secured to the first stock portion;

an elongated inner support member telescopically extendable from and rectractable into, the first stock portion, the inner support member being provided with a plurality of aligned apertures on an underside of the inner support member and adapted to receive the adjustment pin in a selected aperture upon operation of the adjustment lever;

an inline handle secured to a distal end of the inner support member, the inline handle comprising a mounting sleeve mounted in a surrounding relationship over the distal end of the inner support member and a handle member affixed to the mounting sleeve and extending downwardly therefrom, the mounting sleeve being provided with an interiorly threaded ball mount receiver extending co-axially to the inner support member;

a panning section having a ball mount adapted to threadably engage with said ball mount receiver, a ball affixed to the ball mount and a slotted ball cover positioned over the ball and adapted to provide a range of movement, a rotating mounting surface rotatably connected to said ball cover, a panning handle secured to the mounting surface, a lock-release member fitted in the panning handle and adapted to locking and unlocking positioning of said panning section, and a threaded camera connector fitted in an upper part of the mounting surface and adapted for engagement with a camera threaded socket connector.

22. The apparatus of claim 21, comprising a flexible strap secured to lower part of the second stock portion.

23. The apparatus of claim 21, comprising a cushioning member attached to an outer surface of the second stock portion.

24. The apparatus of claim 21, wherein the first stock portion has a cylindrical opening configured for telescopically receiving the inner support member therein.

25. The apparatus of claim 21, wherein the inline handle extends downwardly from the inline handle sleeve.

\* \* \* \* \*